(12) United States Patent
Kim

(10) Patent No.: US 8,345,295 B2
(45) Date of Patent: Jan. 1, 2013

(54) DEVICE AND METHOD FOR CONTROLLING INITIALIZATION OF IMAGE FORMING APPARATUS USING NAND FLASH MEMORY

(75) Inventor: Sun-jin Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1422 days.

(21) Appl. No.: 11/526,682

(22) Filed: Sep. 26, 2006

(65) Prior Publication Data

US 2007/0081188 A1    Apr. 12, 2007

(30) Foreign Application Priority Data

Oct. 10, 2005    (KR) .................................. 2005-94914

(51) Int. Cl.
- G06K 15/00 (2006.01)
- G06F 9/00 (2006.01)
- G06F 9/24 (2006.01)
- G06F 15/177 (2006.01)
- G03G 15/20 (2006.01)

(52) U.S. Cl. .................. 358/1.16; 713/1; 713/2; 399/70

(58) Field of Classification Search ................. 358/1.16; 713/1, 2

See application file for complete search history.

(56) References Cited

U.S. PATENT DOCUMENTS

| 6,397,271 | B1 * | 5/2002 | Okada et al. ..................... 710/36 |
| 6,601,167 | B1 * | 7/2003 | Gibson et al. ...................... 713/2 |
| 6,831,859 | B2 | 12/2004 | Hosono et al. | |
| 2003/0063316 | A1 * | 4/2003 | Irino ............................ 358/1.16 |
| 2003/0172261 | A1 * | 9/2003 | Lee et al. ........................... 713/1 |
| 2003/0219274 | A1 * | 11/2003 | Hirose et al. .................... 399/92 |
| 2004/0017708 | A1 * | 1/2004 | Choi et al. ...................... 365/200 |

(Continued)

FOREIGN PATENT DOCUMENTS

EP    1 387 284    2/2004

(Continued)

OTHER PUBLICATIONS

Office Action dated Sep. 7, 2007 of Chinese Patent Application No. 2006101422519.

*Primary Examiner* — King Poon
*Assistant Examiner* — Vincent Peren
(74) *Attorney, Agent, or Firm* — Staas & Halsey LLP

(57) ABSTRACT

A device and method for controlling the initiation of an image forming apparatus are provided using a NAND flash memory. The device for controlling initiation of an image forming apparatus includes: a NAND flash memory for storing a boot program and system control programs for initiating the image forming apparatus; a random-access-memory (RAM) for temporarily storing an execution program and data; and a driving unit arranged to first read the boot program and an engine control program among the system control programs from the NAND flash memory, execute the boot program and the engine control program, then read remaining system control programs from the NAND flash memory and store the remaining system control programs in the RAM when the boot program and the engine control program are being executed. Since the remaining system control programs and data that have not been read during printing preparation are read by driving a driving unit of the image forming apparatus, the preparation time for the image forming apparatus to begin printing operation can be greatly shortened.

13 Claims, 3 Drawing Sheets

U.S. PATENT DOCUMENTS

| | | | |
|---|---|---|---|
| 2004/0042041 A1* | 3/2004 | Yun | 358/1.15 |
| 2005/0108500 A1* | 5/2005 | Kishida et al. | 711/218 |
| 2005/0157554 A1* | 7/2005 | Yanagawa | 365/185.17 |
| 2005/0273589 A1* | 12/2005 | Gong | 713/2 |
| 2006/0072136 A1* | 4/2006 | Hodder et al. | 358/1.11 |
| 2006/0107031 A1* | 5/2006 | Kouno et al. | 713/2 |
| 2006/0195650 A1* | 8/2006 | Su et al. | 711/103 |

FOREIGN PATENT DOCUMENTS

| | | |
|---|---|---|
| JP | 2003-165248 | 6/2003 |
| JP | 2005-10942 | 1/2005 |
| KR | 2003-14127 | 2/2003 |
| KR | 2004-26461 | 3/2004 |
| KR | 2004-64149 | 7/2004 |

* cited by examiner

DEVICE AND METHOD FOR CONTROLLING INITIALIZATION OF IMAGE FORMING APPARATUS USING NAND FLASH MEMORY

CROSS-REFERENCE TO RELATED PATENT APPLICATION

This application claims all benefits accruing under 35 U.S.C. §119 from Korean Patent Application No. 2005-94914, filed on Oct. 10, 2005, in the Korean Intellectual Property Office, the disclosure of which is incorporated by reference herein.

BACKGROUND OF THE INVENTION

1. Field of the Invention

The present invention relates to a device and method for initializing an image forming apparatus, and more particularly, to a device and method of controlling the initialization of an image forming apparatus using a NAND flash memory from which a boot program and various control programs are sequentially read to prepare for operation.

2. Related Art

Advances in digital technology have led to the development of image forming apparatuses including as digital multi-functional machines in which a printer, a facsimile, a scanner, and a copier are combined. However, these digital multi-functional machines require complex circuit configurations and control devices, and increase the size of programs for controlling various functions to many mega bytes, thereby increasing hardware costs.

Typically, in such image forming apparatuses, programs are stored in a NOR flash memory, and font data for forming printed characters are stored in a separate mask ROM. However, as the image forming apparatuses become more complex and large in size, the size of programs also becomes large and complex. As a result, many hardware costs are needed to implement a system using the NOR flash memory, and a large number of parts are needed to implement a system using the mask ROM which is expensive and requires a large number of control signals. In addition, complex patterns must also be formed on a Printed Circuit Board (PCB) to present a complex data bus for input and output of data, an address bus signal, and various control signals. Thus, component costs increase, PCBs become larger, and image forming apparatuses become more vulnerable to various types of noise due to the formation of a complex data bus and address bus.

Recently, in order to solve these shortcomings, there has been proposed a technique for executing programs by using an NOR flash memory and storing data in an NAND flash memory instead of the mask ROM, which is expensive and requires for a large number of control signals. However, an expensive NOR memory is still required to accommodate an ever-increasing number of system control programs despite the replacement of the mask ROM with the NAND flash memory for storing data.

Moreover, as much as 10 MB of data is still required for fonts necessary for the formation of various printed characters. Therefore, when programs are stored in the NAND flash memory, as much as 10 MB of data stored in the NAND flash memory must be copied to a RAM memory before the programs are executed for code interpretation. As a result, a significant amount of time is still required for an image forming apparatus to interpret program codes to complete the preparation for operation, such as data reception.

SUMMARY OF THE INVENTION

Several aspects and example embodiments of the present invention provide a device and method for initiating an image forming apparatus which can greatly minimize the preparation time for the initial image forming operation.

Additional aspects and/or advantages of the invention will be set forth in part in the description which follows and, in part, will be obvious from the description, or may be learned by practice of the invention.

According to an embodiment of the present invention, there is provided a device for controlling initiation of an image forming apparatus through the use of a NAND flash memory. Such a device comprises: a NAND flash memory for storing a boot program and system control programs for initiating the image forming apparatus; a random-access-memory (RAM) for temporarily storing an execution program and data; and a driving unit arranged to first read the boot program and an engine control program among the system control programs from the NAND flash memory, execute the boot program and the engine control program, and then read remaining system control programs from the NAND flash memory, and load the remaining system control programs sequentially in the RAM when executing the engine control program.

According to an aspect of the present invention, the driving unit may include an internal memory, such as a cache, for storing the boot program and the engine control program read from the NAND flash memory.

According to an aspect of the present invention, a NAND flash memory controller is further provided for reading the boot program and the engine control program from the NAND flash memory under the control of the driving unit, storing the boot program and the engine control program in the internal memory of the driving unit, reading the remaining system control programs from the NAND flash memory, and storing the remaining system control programs in the RAM, when executing the engine control program.

According to an aspect of the present invention, the engine control program may include: an interface control program for displaying a status of the image forming apparatus; and a driving control program for controlling different engine parts of the image forming apparatus, including a motor, an image fixing unit and a fan.

According to an aspect of the present invention, the system control programs may include at least one of a kernel program, an emulation program, and font data. The driving unit may maintain a busy signal indicating a data reception status of a parallel port at high priority until the image forming apparatus is ready for printing operation.

In accordance with another embodiment of the present invention, there is provided a method of controlling the initiation of an image forming apparatus through the use of a NAND memory. Such a method comprises initially reading a boot program and an engine control program among system control programs that are stored in the NAND flash memory, and executing the boot program and the engine control program; and subsequently reading remaining system control programs from the NAND flash memory and storing the system control programs in a random-access-memory (RAM), when executing the engine control program.

According to an aspect of the present invention, the method may further include providing a visual display of an engine driving status of the image forming apparatus when executing the engine control program, before reading the remaining system control programs and storing the system control programs in the RAM. In addition, such a method may further include maintaining a busy signal indicating a data reception status of a parallel port at high priority until the image forming apparatus is ready for printing, before reading the remaining system control programs and storing the system control programs in the RAM.

In accordance with another embodiment of the present invention, an image forming apparatus is provided with a NAND flash memory to store a boot program and system control programs for initiating the image forming apparatus; a driving unit including an internal memory, arranged to initiate the image forming apparatus for operation; an external memory; and a NAND flash memory controller arranged, when an electric current is supplied to the image forming apparatus, to load the boot program and an engine control program among the system control programs from the NAND flash memory into the internal memory, and to load remaining system control programs from the NAND flash memory into the external memory, when the driving unit executes the boot program and the engine control program, wherein the driving unit is configured to first execute the boot program and an engine control program among the system control programs from the NAND flash memory, respectively, and then sequentially execute the remaining system control programs from the NAND flash memory, after the boot program and the engine control program are executed.

In addition to the example embodiments and aspects as described above, further aspects and embodiments of the present invention will be apparent by reference to the drawings and by study of the following descriptions.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. The following represents brief descriptions of the drawings, wherein:

DETAILED DESCRIPTION OF THE EMBODIMENTS

Figure 1:
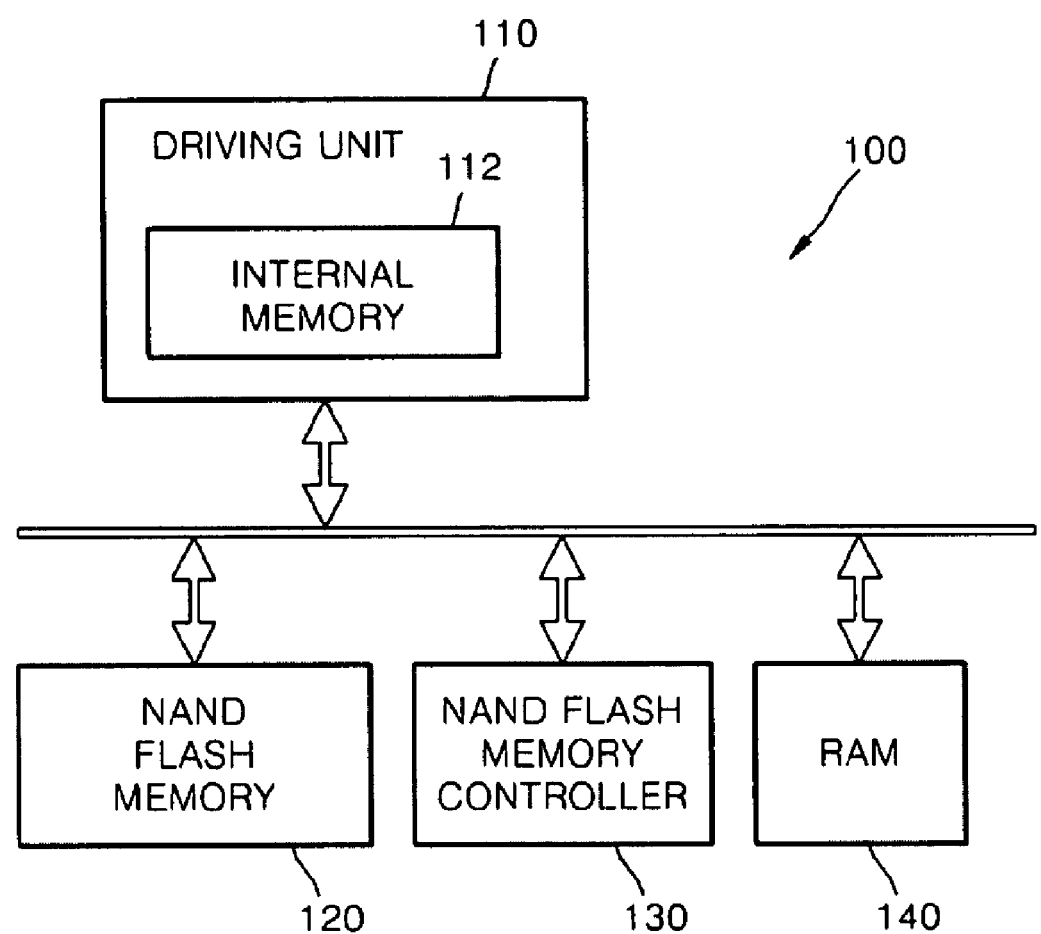
FIG. 1 is a block diagram of an example initiation driving unit according to an embodiment of the present invention.

An image forming apparatus such as a digital multi-functional machine, typically includes a driving unit for processing image data received from a host computer. Such a driving unit includes a central processing unit (CPU) for processing data, a memory for storing received data, an input/output (I/O) device for receiving and transmitting data, and a hard disk drive with a large storage capacity. For purposes of clarity and brevity, the present invention relates to control of the initiation of an image forming apparatus, one of the various functions of the driving unit as described. Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a block diagram of an example initiation driving unit according to an embodiment of the present invention. Referring to FIG. 1, the initiation driving unit 100 includes a driving unit 110, a NAND flash memory controller 120, a NAND flash memory 130, and a random-access-memory (RAM) 140.

The driving unit 110 represents a micro-processor with an internal memory 112 such as a cache. The NAND flash memory 120 stores a boot program and system control programs including an engine control program and font data for initiating an image forming apparatus. The NAND flash memory controller 130 controls access to the NAND flash memory 120, via the driving unit 110.

When an electric current is supplied to an image forming apparatus, the driving unit 110 first reads the boot program and the engine control program among the system control programs from the NAND flash memory 130, and executes both the boot program and the engine control program to initiate operation of the image forming apparatus. When the boot program and the engine control program are executed to initiate operation of the image forming apparatus, the driving unit 110 then reads the remainder of the system control programs, loads the same into the RAM 140, and then sequentially executes the system control programs after the boot program and the engine control program are executed.

During the initialization, the driving unit 110 maintains a busy signal indicating a data reception status of a parallel port, such as an IEEE1284 port, which is a data reception module of the image forming apparatus, at a high priority in order to prevent the image forming apparatus from receiving data for a printing operation.

The NAND flash memory controller 130 controls the NAND flash memory 120, via the driving unit 110. The NAND flash memory controller 130 sequentially reads programs stored in the NAND memory 130 in units of one page, and stores the programs in an internal memory 112 of the driving unit 110, or in an external memory of the driving unit 110, such as a RAM 140. When an electric current is supplied to the image forming apparatus, the NAND flash memory controller 130 reads the boot program and the engine control program from the NAND flash memory 120 for initiating the image forming apparatus, and stores the read boot program and engine control program in the internal memory 112, under the control of the driving unit 110. The NAND flash memory controller 130 then reads the remainder of the system control programs from the NAND flash memory 120, and stores the same in the RAM 140, when the driving unit 110 executes the boot program and the engine control program.

The NAND flash memory 120 stores the boot program, the system control programs, and the font data for initiating the image forming apparatus in address regions thereof. The NAND flash memory 120 can read and write in units of pages and delete in units of blocks. For example, the size of one page may be 512 bytes, and the size of one block, which consists of 32 pages, may be 16 KB. Accordingly, the programs can be read out from the NAND flash memory 130 in units of pages. In an example embodiment of the present invention, memory mapping can be performed in units of pages or blocks.

Figure 2:
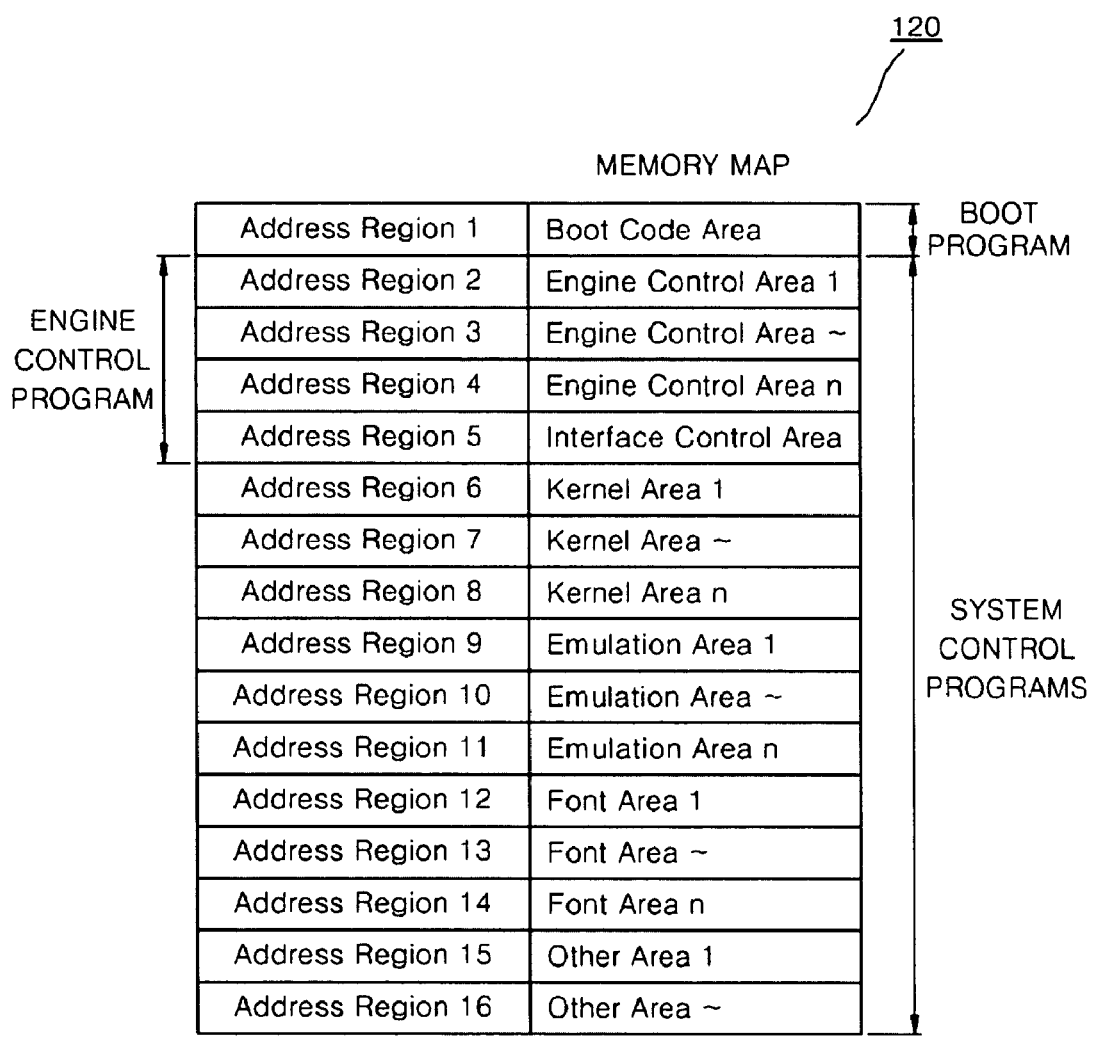
FIG. 2 is an example map configuration illustrating address regions of a NAND flash memory shown in FIG. 1.

Turning now to FIG. 2, an example memory map configuration of a NAND flash memory 120 is shown. For example, the NAND flash memory 120 may contain sixteen (16) different address regions, address regions #1 to #16. A boot code area may be located at an address region #1 to store a boot program for initiating the image forming apparatus. An engine control area and a system control area may be located at address regions #2, #3, #4 and #5 to store an engine control program for controlling user interface and driving units of the image forming apparatus. A kernel area may be located at address regions #6, #7 and #8 for controlling a variety of interfaces of the image forming apparatus. An emulation area may be located at address regions #9, #10 and #11 for performing a variety of logic operations. A font area may be located at address regions #12, #13 and #14 for storing fonts supporting characters necessary for printing. In addition, a reserved area may be reserved for other programs. These areas are isolated from one another. Aside from the boot program, all programs are known as system control programs, and an engine control program is a subset of the system control programs stored in the NAND flash memory 120.

The engine control program includes an interface control program for controlling a user interface for displaying a driving status of the image forming apparatus, and a driving control program for controlling different engine parts of the image forming apparatus, such as a motor, an image fixing unit, and a fan. The user interface program may be read together with a boot program, while the driving control program included in system control programs may be executed.

The image forming apparatus, which uses toner, performs an image fixing process to fix a toner image that is transferred to a printable medium, such as paper, after performing a predetermined process for an electronic image. Generally, the image fixing process is performed to complete the final printed image by applying a predetermined pressure to the toner image transferred to the printing paper at a high temperature. The high temperature is necessary to guarantee proper image fixing onto the printable medium. Thus, a certain amount of time is required to heat an image fixing unit until the image fixing unit is in a printable state. The time required for the image fixing unit to prepare for possible printing impacts the printing speed of the image forming apparatus.

According to an example embodiment of the present embodiment, the engine control program for driving the image fixing unit is executed immediately after finishing system initiation by loading the engine control program together with the boot program from the internal memory 112 of the driving unit 110, as described in connection with FIG. 1, in order to prepare for printing operation. At the same time, the remaining system control programs are read and loaded into the RAM 140. This makes it possible to shorten the initial printing time for the image forming apparatus.

Figure 3:
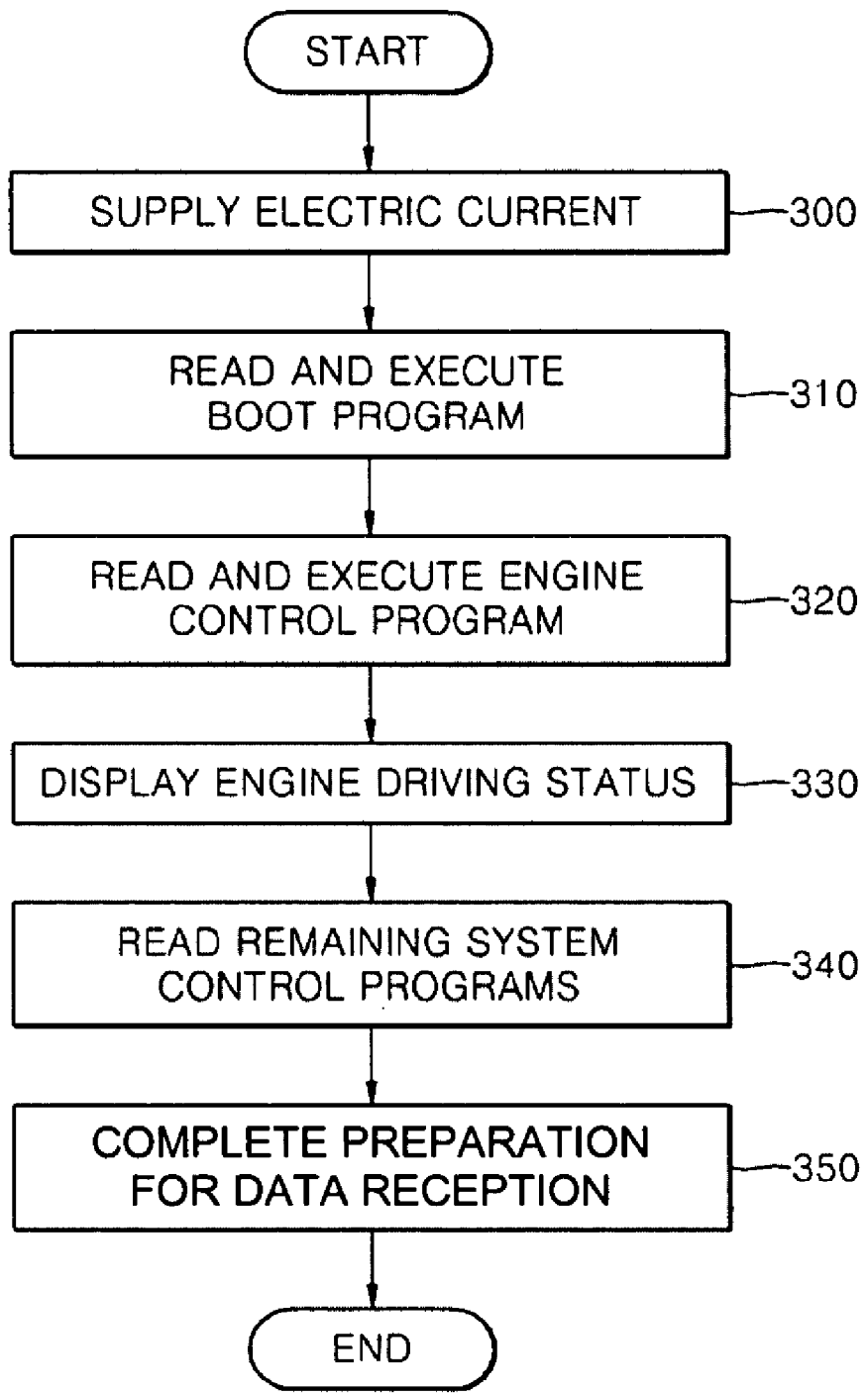
FIG. 3 is a flow chart illustrating a method of controlling the initiation of an image forming apparatus according to an embodiment of the present invention.

FIG. 3 is a flow chart illustrating a method of controlling the initiation of an image forming apparatus according to an embodiment of the present invention.

As shown in FIG. 3, when an electric current is supplied to an image forming apparatus at operation 300, a boot program is read from a NAND flash memory 120 and executed at operation 310. The operation of reading and executing the boot program from the NAND flash memory is referred to as an auto boot function. The boot program read from the NAND flash memory is stored in an internal memory 112 of a driving unit 110, as shown in FIG. 1, and is executed to boot the image forming apparatus.

When the boot program is executed, an engine control program among system control programs is read from the NAND flash memory 120 and executed at operation 320. The engine control program read from the NAND flash memory is then stored in the internal memory 112 of the driving unit 110. Then, an interface control program included in the engine control program for controlling the status display of the image forming apparatus is the first of the system control programs to be executed, and a driving control program is executed to control the operation of different engine parts of the image forming apparatus, such as a motor, an image fixing unit, and a fan. At operation 320, a busy signal indicating the data reception status of a parallel port is also set to a high priority so as to prevent the image forming apparatus from receiving print data until the image forming apparatus is ready to print.

When the engine control program is executed at operation 320, the engine driving status of the image forming apparatus is displayed on a display panel at operation 330. When the interface control program is executed at operation 320, the driving control program is executed. Concurrently, the moving status of different engine parts may be displayed on the display panel.

The remaining system control programs that have not been read, i.e., the system control programs other than the engine control program, are then read and stored in a RAM 140 at operation 340. A busy signal indicating the data reception status of the parallel port is changed from high priority to low priority to complete preparing for data reception at operation 350. In addition, the completion status of the preparation for printing is displayed on the display panel.

According to the present invention, the boot program and the engine control program stored in a NAND flash memory are first read and executed. System control programs and data that have not been read during printing preparation are then read by a driving unit of the image forming apparatus. This makes it possible to advantageously shorten the preparation time for the image forming apparatus.

Various components of the initiating driving unit 110, as shown in FIG. 1, can be integrated into a single control module, or alternatively, can be implemented in software or hardware, such as, for example, an application specific integrated circuit (ASIC). As such, it is intended that the processes described herein be broadly interpreted as being equivalently performed by software, hardware, or a combination thereof. In addition, the boot program and the system control programs can be written, via a variety of software languages, including C, C++, Java, Visual Basic, and many others. These software programs may include data and instructions which can also be stored on one or more machine-readable storage media, such as dynamic or static random access memories (DRAMs or SRAMs), erasable and programmable read-only memories (EPROMs), electrically erasable and programmable read-only memories (EEPROMs); magnetic disks such as fixed, floppy and removable disks; other magnetic media including tape; and optical media such as compact discs (CDs) or digital video discs (DVDs).

While there have been illustrated and described what are considered to be example embodiments of the present invention, it will be understood by those skilled in the art and as technology develops that various changes and modifications, may be made, and equivalents may be substituted for elements thereof without departing from the true scope of the present invention. Many modifications, permutations, additions and sub-combinations may be made to adapt the teachings of the present invention to a particular situation without departing from the scope thereof. For example, the NAND flash memory controller 130, as shown in FIG. 1, can be incorporated into a main driving unit 110, and can simply be referred to as "a main control unit". In addition, the memory map of a NAND flash memory 130, as shown in FIG. 2, can be arranged differently as long as a boot program and an engine control program are read and executed first prior to reading the remaining system control programs. Moreover, the boot program and the engine control program can be read and executed serially (in series), as shown in FIG. 3, or concurrently (simultaneously) as described elsewhere. Furthermore, alternative embodiments of the invention can be implemented as a computer program product for use with a computer system. Accordingly, it is intended, therefore, that the present invention not be limited to the various example embodiments disclosed, but that the present invention includes all embodiments falling within the scope of the appended claims.

What is claimed is:

1. A device for controlling the initiation of an image forming apparatus through the use of a NAND flash memory, the device comprising:
    a NAND flash memory to store a boot program and system control programs for initiating the image forming apparatus;
    a random-access-memory (RAM) for temporarily storing an execution program and data; and
    a driving unit arranged to first read the boot program and an engine control program among the system control programs from the NAND flash memory, then initiate the execution of the boot program and the engine control program, then, during the execution of the boot program and the engine control program, read the remaining system control programs from the NAND flash memory and store the remaining system control programs in the RAM,
    wherein the engine control program controls an electromechanical component of the image forming apparatus, and
    wherein during the reading of the remaining system control programs from the NAND flash memory and the storing of the remaining system control programs in the RAM, an image fixing unit of the image forming apparatus is heated by executing the engine control program, in order to prepare for a printing operation.

2. The device as claimed in claim 1, wherein the driving unit comprises an internal memory for storing the boot program and the engine control program read from the NAND flash memory.

3. The device as claimed in claim 2, further comprising a NAND flash memory controller arranged to read the boot program and the engine control program from the NAND flash memory under the control of the driving unit, store the boot program and the engine control program in the internal memory, read remaining system control programs from the NAND flash memory, and store the system control programs in the RAM, when the boot program and the engine control program are being executed.

4. The device as claimed in claim 1, wherein the engine control program comprises: an interface control program for displaying a status of the image forming apparatus; and a driving control program for controlling different engine parts of the image forming apparatus, including a motor, the image fixing unit and a fan.

5. The device as claimed in claim 1, wherein the system control programs comprise at least one of a kernel program, an emulation program, and font data.

6. The device as claimed in claim 1, wherein the driving unit maintains a busy signal indicating a data reception status of a parallel port at a high priority, until the image forming apparatus is ready for printing operation.

7. A method of controlling the initiation of an image forming apparatus through the use of a NAND memory, the method comprising:
    initially reading a boot program and an engine control program among system control programs that are stored in the NAND flash memory, and then
    initiating the execution of the boot program and the engine control program; and then, during the execution of the boot program and the engine control program,
    reading remaining system control programs from the NAND flash memory and storing the system control programs in a random-access-memory (RAM),
    wherein the engine control program controls an electromechanical component of the image forming apparatus, and
    wherein during the reading of the remaining system control programs from the NAND flash memory and the storing of the remaining system control programs in the RAM, an image fixing unit of the image forming apparatus is heated by executing the engine control program, in order to prepare for a printing operation.

8. The method as claimed in claim 7, further providing a visual display of an engine driving status of the image forming apparatus, when the boot program and the engine control program are executed, before reading the remaining system control programs and storing the system control programs in the RAM.

9. The method as claimed in claim 7, further comprising maintaining a busy signal indicating a data reception status of a parallel port at high priority until the image forming apparatus is ready for printing, before reading the remaining system control programs and storing the system control programs in the RAM.

10. An image forming apparatus comprising:
    a NAND flash memory to store a boot program and system control programs for initiating the image forming apparatus;
    a driving unit including an internal memory, arranged to initiate the image forming apparatus for operation;
    an external memory; and
    a NAND flash memory controller arranged, when an electric current is supplied to the image forming apparatus, to first load the boot program and an engine control program among the system control programs from the NAND flash memory into the internal memory, and then, during the execution of the boot program and the engine control program by the driving unit, to load remaining system control programs from the NAND flash memory into the external memory, wherein the driving unit is configured to first execute the boot program and an engine control program among the system control programs from the NAND flash memory, respectively, and then sequentially execute the remaining system control programs from the NAND flash memory, after the boot program and the engine control program are executed,
    wherein the engine control program controls an electromechanical component of the image forming apparatus, and
    wherein during the reading of the remaining system control programs from the NAND flash memory and the storing of the remaining system control programs in the RAM, an image fixing unit of the image forming apparatus is heated by executing the engine control program, in order to prepare for a printing operation.

11. The image forming apparatus as claimed in claim 10, wherein the engine control program comprises:
    an interface control program for displaying a status of the image forming apparatus; and a driving control program for controlling different engine parts of the image forming apparatus, including a motor, the image fixing unit and a fan.

12. The image forming apparatus as claimed in claim 10, wherein the system control programs comprise at least one of a kernel program, an emulation program, and font data.

13. The image forming apparatus as claimed in claim 10, wherein the driving unit maintains a busy signal indicating a data reception status of a parallel port at a high priority, until the image forming apparatus is ready for printing operation.

* * * * *